Feb. 2, 1971 R. L. EASTON ET AL 3,560,880
CRYSTAL OSCILLATOR WITH AUTOMATIC COMPENSATION FOR FREQUENCY DRIFT DUE TO AGING
Filed Dec. 23, 1968
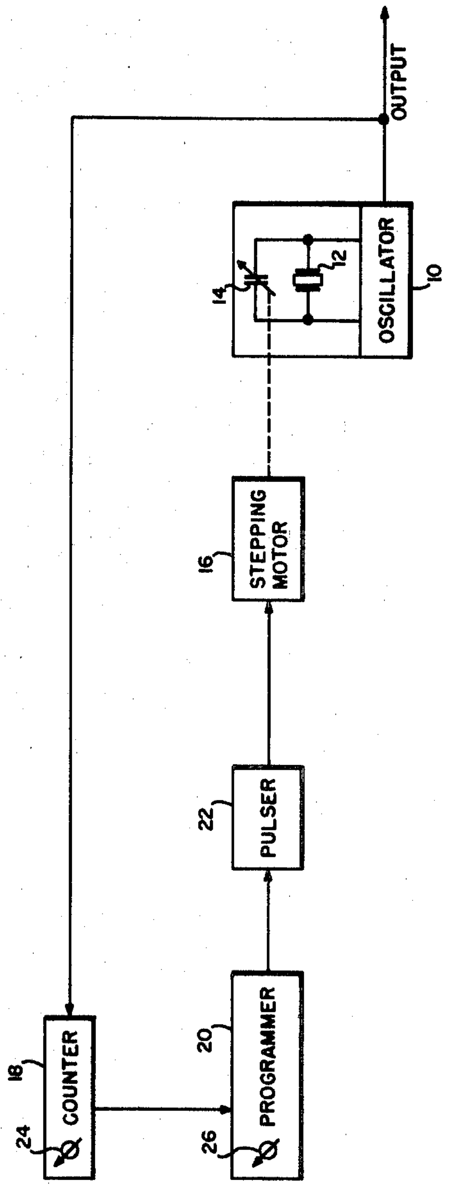
INVENTORS
ROGER L. EASTON
CHARLES A. BARTHOLOMEW
BY James D Murray
ATTORNEYS United States Patent Office 3,560,880

Patented Feb. 2, 1971

3,560,880

CRYSTAL OSCILLATOR WITH AUTOMATIC COMPENSATION FOR FREQUENCY DRIFT DUE TO AGING

Roger L. Easton and Charles A. Bartholomew, Oxon Hill, Md., assignors to the United States of America as represented by the Secretary of the Navy Filed Dec. 23, 1968, Ser. No. 785,883
Int. Cl. H03b 3/04, 5/32
U.S. Cl. 331—158 6 Claims

ABSTRACT OF THE DISCLOSURE

A highly stable crystal oscillator for keeping time precisely wherein the frequency drift due to aging of a quartz crystal is compensated by a programmed electromechanical tuning device.

STATEMENT OF GOVERNMENT INTEREST

The invention described herein may be manufactured and used by or for the Government of the United States of American for governmental purposes without the payment of any royalties thereon or therefor.

BACKGROUND OF THE INVENTION

Before the era of artificial earth satellites, the accuracy of navigation had not improved beyond that available from celestial techniques; but with the introduction of satellite navigation systems a new order of accuracy became possible whereby navigational "fixes" accurate to within a few tenths of a mile are presently routinely obtained.

One of the new satellite navigational systems is termed TIMATION, an acronym for time navigation. In this system, the satellite contains a stable oscillator that precisely times and controls its transmissions. When these transmissions are received by the navigator he compares them with the outputs of his own precision oscillator and from this comparison determines his range from the satellite. Since the satellite's position is known it is a matter of relatively simple and well known techniques to determine the position of the navigator's ship.

Because the TIMATION technique requires that both the satellite and the navigator have precision oscillators and in consideration of factors of cost, weight, etc. it has become an obviously highly desirable goal to develop crystal oscillators having the same order of stability as atomic devices, i.e. to be stable within an error rate of a few parts in $10^{12}$ per day. To attain this goal, The Naval Research Laboratory and other laboratories have embarked on research programs intended to raise the stability of crystal oscillators.

That the uncompensated natural frequencies of crystals change for many reasons has long been known. These reasons may be conveniently classified for purposes of compensation as being either environmental or aging reasons. Changes of environmental parameters, such as temperature, pressure, orientation, etc. are usually sensed and appropriate compensations made in the oscillator circuit, usually under the control of, or by impedance changes in, the sensing element. Frequency changes due to aging reasons, such as changes in the chemical or physical properties of the crystal, have hitherto been corrected daily by comparison with precise standards and, when the oscillator was on a satellite, appropriate corrections made by radio command. The obtainable accuracy and the operational complexity of prior methods and apparatus for compensating for aging effects have in general been unsatisfactory and the present invention is directed to providing an improved method and apparatus for eliminating the frequency drift in oscillators due to crystal aging effects.

SUMMARY OF THE INVENTION

In the invention disclosed herein, the drift of a crystal oscillator due to aging effects of the crystal is determined and frequency compensation is programmed and made by an electromechanical tuning device.

OBJECTS OF THE INVENTION

It is, therefore, an object of the invention to provide an improved and highly stable crystal oscillator.

Another object is to provide a method for compensating for the aging effects in a crystal oscillator.

Yet another object of the present invention is the provision of a highly stable crystal oscillator wherein aging effects are compensated for on a programmed basis and wherein the compensation is made an electromechanical tuning device.

A still further object is to provide a method and apparatus for compensating for aging effects in a crystal oscillator by determining the drift rate due to aging of the crystal, by programming appropriate compensation for such drift rate and by making such compensation by an electromechanical tuning device.

DESCRIPTION OF THE DRAWINGS

Other objects and advantages of the invention will hereinafter become more fully apparent from the following description and annexed drawing, which illustrates a preferred embodiment of the invention and wherein the single figure shows the preferred embodiment in diagrammatic form.

DESCRIPTION OF THE PREFERRED EMBODIMENT

Referring now to the figure, there is shown an oscillator 10, which typically could be on a TIMATION satellite. It would therefore be highly desirable that the output frequency of oscillator 10 be extremely stable and for this purpose, in addition to other compensatory circuitry not shown, the oscillator 10 includes the presently to be described invention whereby aging effects in the crystal 12 are compensated for.

The output frequency of oscillator 10 is controlled by crystal 12 and variable capacitor 14 in a conventional manner which need not be described herein. The crystal 12, variable capacitor 14 and stepping motor 16, which is mechanically connected to and controls the variable capacitor 14, are termed the electromechanical tuning device for oscillator 10.

The output of oscillator 10 is connected to counter 18 which, after attaining a predetermined count, produces an electric pulse. The reader will recognize that, should unnecessary loading of oscillator 10 be avoided, the counter 18 could take the form of any reliable pulsing timer since high precision is not a requisite of this component.

Programmer 20 is connected to receive the pulse output of counter 18 and to control stepping motor 16 according to a predetermined program or time sequence. It may be desired to connect a power amplifier or other form of power pulser 22 between the programmer 20 and the motor 16 to provide sufficient power to drive the motor.

By now the method and operation of the invention will be apparent. By laboratory testing, with environmental parameters stabilized, the drift rate of the oscillator 10 due to aging of the crystal 12, as well as the necessary compensation by stepping motor and variable capacitor 14, is determined. The counter 18 and programmer 20 are then adjusted, by controls 24 and 26, so that the drift of oscillator 10 due to aging of crystal 12 will be minimized.

There is, of course, a certain minimum increment of correction which can be made by stepping motor 16 and capacitor 14. This minimum correction should be made at the appropriate shortest time, since the drift error is cumulatively counted into the maximum oscillator timing error. To illustrate, let it be assumed that the oscillator drift rate due to aging effects is one part in $10^{12}$ per hour. At the end of three hours the synchronous or time error (i.e. the count error) will be six parts in $10^{12}$, one part for the first hour, two for the second and three for the third. If an appropriate correction is made every hour, the maximum error will not exceed one part in $10^{12}$. The reader will also realize that it may be desirable for the programmer 20 to have a flexible pattern capability, i.e. to be able to either periodically block a pulse from counter 18 or to produce two or more pulses in response to a single pulse from counter 18.

After the determination of the aging drift and the necessary correction thereof and the adjustment of controls 24 and 26, the system of the figure is ready for use in a satellite as a very precise oscillator in, for example, the TIMATION system.

There has been disclosed a method and preferred embodiment of apparatus for compensating the aging effects in a crystal oscillator by determining the drift rate due to aging of the crystal, by programming appropriate compensation for such drift rate and by making such compensation by an electromechanical tuning device. Obviously many modifications and variations of the present invention are possible in the light of the above teachings. It is therefore to be understood, that within the scope of the appended claims, the invention may be practiced otherwise than as specifically described.

What is claimed and desired to be secured by Letters Patent of the United States is:

1. Apparatus for compensating for the aging effects in a crystal oscillator intended to produce a highly stable output comprising:

Electromechanical tuning device means operatively included in said oscillator for tuning said oscillator by incrementally changing an impedance in said oscillator;

Programming means connected to control said electromechanical tuning device means to incrementally change said impedance at predetermined time periods according to a predetermined pattern and Timing means connected to said programming means to energize said programming means at said predetermined time periods;

Whereby the incrementally made changes to said impedance compensates for the aging effects in said crystal oscillator and the output thereof is highly stable.

2. The apparatus of claim 1 wherein said timing means is a counter connected to said oscillator output.

3. The apparatus of claim 1 wherein said electromechanical tuning device means includes a stepping motor mechanically connected to a variable capacitor.

4. The apparatus of claim 3 wherein said timing means is a counter connected to said oscillator output.

5. A high stable crystal oscillator comprising:

A variable impedance connected to control the frequency of said crystal oscillator;

A motor connected to said variable impedance;

A programmer connected to said motor and

A counter connected to the output of said oscillator and to said programmer.

6. The crystal oscillator of claim 5 wherein said programmer and said counter each include adjustment means whereby the operation of said programmer and said counter can be changed.

References Cited

UNITED STATES PATENTS

| | | | |
|---|---|---|---|
| 2,959,742 | 11/1960 | Felch et al. | 331—14 |
| 3,428,916 | 2/1969 | Hovenga et al. | 331—116 |

OTHER REFERENCES

General Radio, Experimenter, vol. 38, No. 6, June 1964, pp. 1–12.

Gerber et al.: Proceedings of the IEEE, vol. 55, No. 6, June 1967, pp. 783–791.

ROY LAKE, Primary Examiner

S. H. GRIMM, Assistant Examiner

U.S. Cl. X.R.

331—175